US012601932B2

(12) United States Patent
Li et al.

(10) Patent No.: US 12,601,932 B2
(45) Date of Patent: Apr. 14, 2026

(54) COLOR-CHANGING EYEGLASS

(71) Applicant: WICUE USA INC., Santa Clara, CA (US)

(72) Inventors: Fenghua Li, Santa Clara, CA (US); Cai Guo, Santa Clara, CA (US)

(73) Assignee: Wicue, Inc.

( * ) Notice: Subject to any disclaimer, the term of this patent is extended or adjusted under 35 U.S.C. 154(b) by 311 days.

(21) Appl. No.: 18/365,244

(22) Filed: Aug. 4, 2023

(65) Prior Publication Data

US 2025/0044618 A1 Feb. 6, 2025

(51) Int. Cl.
*G02C 7/10* (2006.01)
(52) U.S. Cl.
CPC .................................... *G02C 7/104* (2013.01)
(58) Field of Classification Search
CPC .... G02C 7/101; G02C 7/104; G02C 2202/16; G02F 1/13318; G02F 1/13338
See application file for complete search history.

(56) References Cited

U.S. PATENT DOCUMENTS

2017/0068112 A1* 3/2017 Bhatta .................... G02C 7/101
2020/0089025 A1* 3/2020 Li .......................... G02C 11/10
2023/0096399 A1* 3/2023 Ha ..................... G02B 27/0172
359/278

* cited by examiner

*Primary Examiner* — Nelson M Rosario

(57) ABSTRACT

The present application discloses a color-changing eyeglass. The color-changing eyeglass includes a first lens with one or more of color-changing films, a second lens with one or more of color-changing films, a first control element, and a second control element. The first control element is communicated with the second control element, a color of the color-changing film in the first lens is changeable based on a voltage provided by the first control element, and a color of the color-changing film in the second lens is changeable based on a voltage provided by the second control element in response to a signal from the first control element.

20 Claims, 4 Drawing Sheets

COLOR-CHANGING EYEGLASS

TECHNICAL FIELD

The present application relates to the field of smart wearable devices, and particularly relates to a color-changing eyeglass.

BACKGROUND

Smart wearable devices become more and more popular in current daily life, and are increasingly involved in wide applications. The application includes not only individually designed products for life, entertainment, health monitor, and communication, but also new designs that are combined with traditional products, such as dimming eyeglass and color-changing eyeglass.

SUMMARY

The present application provides a color-changing eyeglass. The color-changing eyeglass includes: a plurality of layers of color-changing films, one of the color-changing films displays a same or different color as another of the color-changing films in a case that an electric field is applied to the color-changing films; a first eyeglass arm, wherein the first eyeglass arm is provided with a first control element; a first glasses frame, wherein the first eyeglass arm is pivoted with the first glasses frame; a first lens, wherein the first lens is attached to the first glasses frame, one or more layers of the color-changing films are stacked in the first lens, and the first control element is electrically connected to the first lens and is configured to apply the electric field to the one or more layers of the color-changing films in the first lens; a second eyeglass arm, wherein the second eyeglass arm is provided with a second control element; a second glasses frame, wherein the second eyeglass arm is pivoted with the second glasses frame; and a second lens, wherein the second lens is attached to the second glasses frame, one or more layers of the color-changing films are stacked in the second lens, and the second control element is electrically connected to the second lens and is configured to apply the electric field to the one or more layers of the color-changing films in the second lens; wherein the first glasses frame is connected with the second glasses frame; wherein the first control element is communicated with the second control element, a color of the color-changing film in the first lens is changeable based on a voltage provided by the first control element, and a color of the color-changing film in the second lens is changeable based on a voltage provided by the second control element in response to a signal from the first control element.

In an embodiment, the first control element applies the electric field to each layer of the color-changing films in the first lens individually, or applies the electric field to at least two layers of the color-changing films in the first lens simultaneously.

In an embodiment, the first lens and the second lens each comprise a color blindness correction film, the color blindness correction film of the first lens is attached to the color-changing film in the first lens, the color blindness correction film of the second lens is attached to the color-changing film in the second lens, and the color blindness correction film is configured to adjust a ratio of three basic colors of incident lights to a normal spectral curve.

In an embodiment, the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

In an embodiment, the color blindness correction film of the first lens is disposed between one layer of the anti-fingerprint layers and the color-changing film in the first lens, and the color blindness correction film of the second lens is disposed between one layer of the anti-fingerprint layers and the color-changing film in the second lens.

In an embodiment, the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

In an embodiment, the first lens and the second lens each comprise an anti-blue light layer, the anti-blue light layer of the first lens is attached between one layer of the anti-fingerprint layers and the color-changing film in the first lens, and the anti-blue light layer of the second lens is attached between one layer of the anti-fingerprint layers and the color-changing film in the second lens.

In an embodiment, the anti-blue light layer of the first lens is disposed on a side of the color-changing film in the first lens close to an eye, and the anti-blue light layer of the second lens is disposed on a side of the color-changing film in the second lens close to the eye.

In an embodiment, the anti-blue light layer of the first lens is disposed on a side of the color-changing film in the first lens away from an eye, and the anti-blue light layer of the second lens is disposed on a side of the color-changing film in the second lens away from the eye.

In an embodiment, the first lens and the second lens each comprise an anti-blue light layer, the anti-blue light layer of the first lens is attached to the color-changing film in the first lens, and the anti-blue light layer of the second lens is attached to the color-changing film in the second lens.

In an embodiment, the first lens comprises a first progressive layer, and the first progressive layer is attached to the color-changing film in the first lens, and wherein the second lens comprises a second progressive layer, the second progressive layer is attached to the color-changing film in the second lens.

In an embodiment, each of the plurality of color-changing films comprises a first substrate layer, a first alignment layer, a liquid crystal layer, a second alignment layer, and a second substrate layer stacked sequentially, wherein the first alignment layer and the second alignment layer are oriented in parallel, and are oriented opposite to each other relative to liquid crystal molecules in the liquid crystal layer.

In an embodiment, the first alignment layer and the second alignment layer are made of PI.

In an embodiment, alignment direction of the first alignment layer and the second alignment layer in one color-changing film is different from alignment direction of the first alignment layer and the second alignment layer in an adjacent color-changing film, and liquid crystal molecules and dye molecules in the one color-changing film are tilted spatially different from liquid crystal molecules and dye molecules in the adjacent color-changing film.

In an embodiment, each of the color-changing films is divided into a plurality of color regions, each of the color regions has dichroic dyes of same or different colors, the first control element applies the electric field individually to each of the color regions, and the second control element applies the electric field individually to each of the color regions.

In an embodiment, the color-changing eyeglass further comprise a first audio and a second audio, the first audio is connected to the first eyeglass arm, the second audio is connected to the second eyeglass arm, and the first audio and the second audio each are configured to communicate with a communication device via Bluetooth and to play sounds.

In an embodiment, the first glasses frame comprises a first recess inside, and the second glasses frame comprises a second recess inside, wherein the first control element and the first audio are disposed in the first recess, and the second control element and the second audio are disposed in the second recess.

In an embodiment, the color-changing eyeglass comprises a first battery and a second battery, the first battery is disposed in the first recess and is configured to supply power to the first control element, and the second battery is disposed in the second recess and is configured to supply power to the second control element.

In an embodiment, the first glasses frame is integrated with the second glasses frame.

In an embodiment, the first glasses frame is connected with the second glasses frame through a connecting member.

Figure 1:
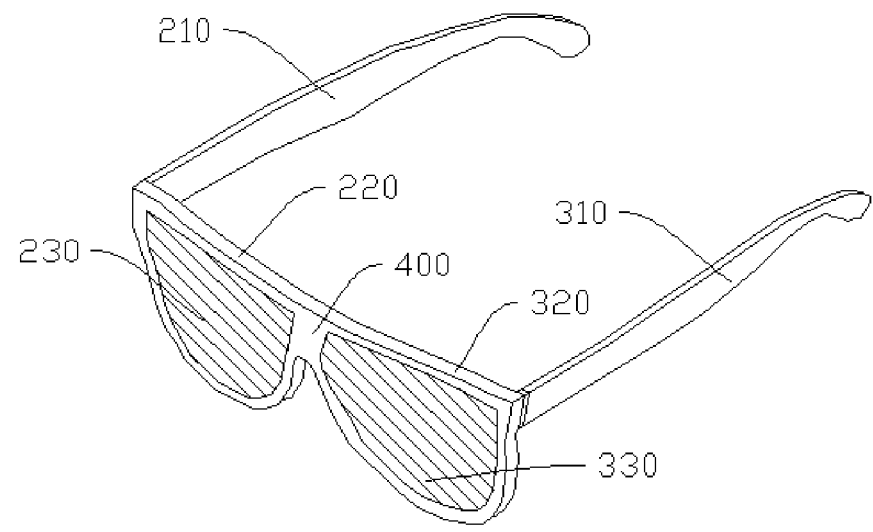
FIG. 1 is a schematic diagram of a color-changing eyeglass according to an embodiment of the present application.

REFERENCE NUMERALS color-changing film 100, first substrate layer 110, second substrate layer 120, liquid crystal layer 130, first alignment layer 140, second alignment layer 150;

first eyeglass arm 210, first glasses frame 220, first lens 230, first battery 240, first control element 250, first recess 260;

second eyeglass arm 310, second glasses frame 320, second lens 330, second battery 340, second control element 350, second recess 360; and connecting member 400; color blindness correction film 500; anti-fingerprint layer 600; anti-blue light layer 700; first audio 800, first sound port 810; second audio 900, second sound port 910; first progressive layer 1000; second progressive layer 1100.

DETAILED DESCRIPTION OF THE EMBODIMENTS

A clear and complete description of the embodiments in the present application is given below in conjunction with the accompanying drawings in the embodiments of the present application. It should be understood that the embodiments described herein are merely a portion but not an entirety of the implements of the present application. Based on the embodiments in the present application, all other embodiments obtained by a person of ordinary skill in the art without creative efforts fall within the scope of protection of the present application.

In the following, the technical solutions in the embodiments of the present disclosure will be clearly and completely described in connection with the accompanying drawings. It should be understood that the described embodiments are merely a part of the embodiments of the present disclosure, rather than all the embodiments. Based on the embodiments in the present disclosure, all other embodiments obtained by a person skilled in the art without involving any inventive effort are within the scope of the present disclosure. Furthermore, it should be understood that the specific embodiments described herein are for purposes of illustration and explanation only and are not intended to limit the disclosure. In the present disclosure, without contrary illustration, the use of positional terms such as "on" and "under" generally describes a position on or under the device in actual use or operation and refers to the direction in the drawings. The terms "in" and "out" refer to a position relative to a profile of the device.

The following provides many different embodiments or examples for implementing the different structures of the present disclosure. In order to simplify the description of the present disclosure, components and arrangements of specific embodiments are described below, which are merely for illustration and explanation and are not intended to limit the disclosure. In addition, the present disclosure may repeat reference numerals and/or reference letters are applied to different embodiments for the purpose of simplicity and clarity, without indicating a relationship between the various embodiments and/or arrangements discussed. In addition, the present disclosure provides examples of various specific processes and materials, but one of ordinary skill in the art will recognize the disclosure of other processes and/or the use of other materials. In the following detailed description, it should be understood that the order in which the following embodiments are described is not intended to limit the preferred orders.

Figure 2:
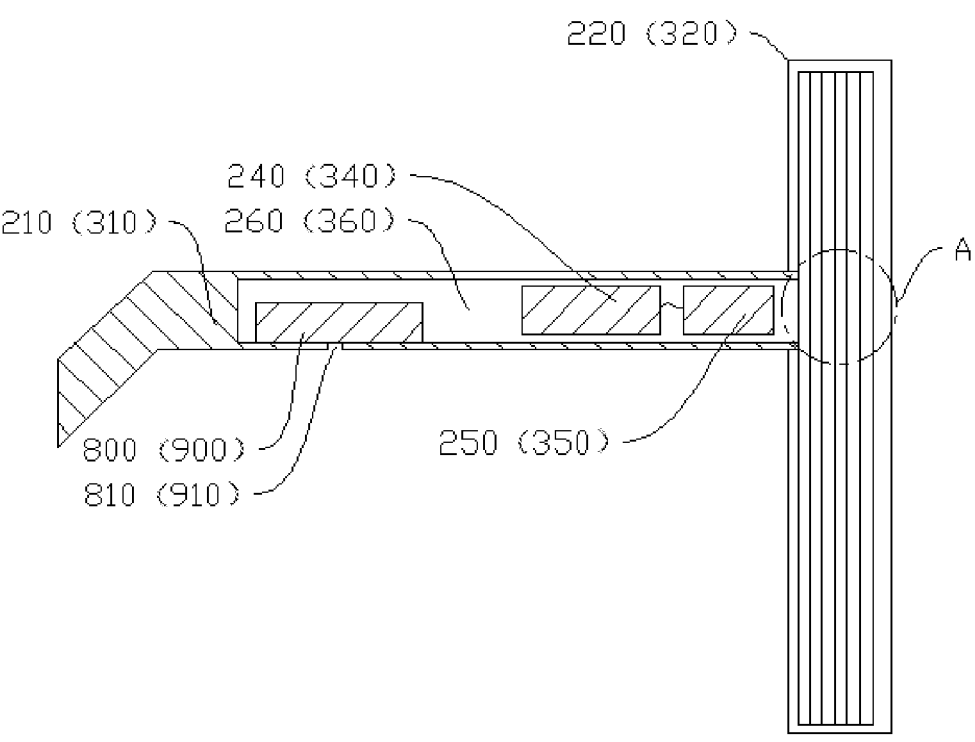
FIG. 2 is a side view of a color-changing eyeglass according to an embodiment of the present application.
Figure 3:
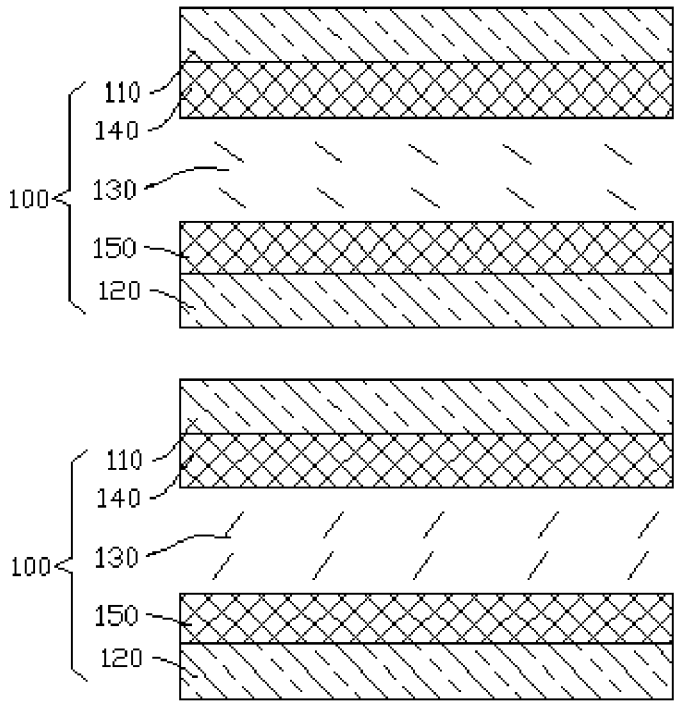
FIG. 3 is a schematic diagram of a color-changing film according to an embodiment of the present application.

Embodiments of the present application provide a color-changing eyeglass, with reference to FIG. 1 to FIG. 6. As shown in FIG. 1, the color-changing eyeglass includes a first eyeglass arm 210, a first glasses frame 220, a second eyeglass arm 310, a second glasses frame 320, and a connecting member 400. The first eyeglass arm 210 is pivoted with the first glasses frame 220, and the second eyeglass arm 310 is pivoted with the second glasses frame 320. The first glasses frame 220 is connected with the second glasses frame 320 through the connecting member 400. Combined with FIG. 2, the first eyeglass arm 210 is provided with a first recess 260, and the second eyeglass arm 310 is provided with a second recess 360. The first recess 260 is recessed inside the first eyeglass arm 210, and is recessed from an end of the first eyeglass arm 210 close to the first glasses frame 220. The first recess 260 is configured to place a first battery 240 and a first control element 250, and the first battery 240 is used to supply power to the first control element 250. A first lens 230 is attached to the first glasses frame 220. One or more layers of color-changing films 100 (as shown in FIG. 3, and which is detailed further in the followings) are stacked in the first lens 230. The first control element 250 is electrically coupled to the first lens 230 and is capable of applying an electric field to the one or more layers of color-changing films 100 in the first lens 230. The second recess 360 is recessed inside the second eyeglass arm 310, and is recessed from an end of the second eyeglass arm 310 close to the second glasses frame 320. The second recess 360 is configured to place a second battery 340 and a second control element 350, and the second battery 340 is used to supply power to the second control element 350. A second lens 330 is attached to the second glasses frame 320. One or more layers of color-changing films 100 (as shown in FIG. 3, and which is detailed further in the followings) are stacked in the second lens 330. The second control element 350 is electrically coupled to the second lens 330 and is capable of applying an electric field to the one or more layers of color-changing films 100 in the second lens 330.

Further, the colors of the color-changing films 100 in the first lens 230 can vary based on the value of the voltage provided by the first control element 250, and the colors of the color-changing films 100 in the second lens 330 can vary based the value of the voltage provided by the second control element 350. The wearer may touch a touch control portion on the first control element 250 to adjust the voltage applied to the color-changing films 100 in the first lens 230, and at the same time, the second control element 350 receives the signal from the first control element 250 and synchronously regulates the voltage applied to the color-changing films 100 in the second lens 330. As such, the first lens 230 and the second lens 330 display the same color. Alternatively, a touch control portion may also be provided on the second control element 350 for the wearer to touch to adjust the voltage applied to the color-changing films 100 in the second lens 330, and at the same time, the first control element 250 receives the signal from the second control element 350 and synchronously regulates the voltage applied the color-changing film 100 in the first lens 330. In an embodiment, the first control element 250 and the second control element 350 each can be communicated via Bluetooth, as such, the second control element 350 can receive the signals from the first control element 250, or the first control element 250 can receive the signals from the second control element 350.

In an embodiment, a plurality of color-changing films 100 may be provided in the lens, and one layer of the color-changing films 100 is capable of displaying a same or a different color with another one layer of the color-changing films 100 when subjected to the electric field.

In an embodiment, the first control element 250 and the second control element 350 communicate with each other via Bluetooth, whereas the first control element 250 can individually apply an electric field to one or more of the color-changing films 100 in the first lens 230, and the second control element 350 can individually apply an electric field to one or more of the color-changing films 100 in the second lens 330 in response to a signal from the first control element 250. As such, the first control element 250 is configured to individually regulate the colors of one or more of the color-changing films 100 in the first lens 230, and at the same time, the second control element 350 is configured to individually regulate the colors of one or more of the color-changing film 100 in the second lens 330.

It should be noted that, for ease of understanding, only one layer or two layers of color-changing film 100 is shown in FIG. 3 to FIG. 6, however, the number of the color-changing films 100 is not limited thereto. As shown in FIG. 3, the color-changing film 100 includes a first substrate layer 110, a second substrate layer 120, and a liquid crystal layer 130. The first substrate layer 110 and the second substrate layer 120 are transparent, and the liquid crystal layer 130 is provided between the first substrate layer 110 and the second substrate layer 120.

Specifically, when the first control element 250 (the second control element 350) provides alternating current/

AC power for the color-changing film 100, the liquid crystal molecules in the liquid crystal layer 130 are driven to be in a planar state parallel to the first substrate 110 and the second substrate 120 or a vertical state perpendicular to the first substrate 110 and the second substrate 120. As the voltage applied by the first control element 250 (the second control element 350) as high, the liquid crystal molecules is more trendy to be the planar state, and the dichroic dye molecules in the liquid crystal layer 130 absorb more lights. As such, the first lens 230 (the second lens 330) appears darker colors. As the voltage applied by the first control element 250 (the second control element 350) as low, the liquid crystal molecules is more trendy to be the vertical state, and the dichroic dye molecules in the liquid crystal layer 130 absorb less lights. As such, the first lens 230 (the second lens 330) appears brighter colors. In a case that the dichroic dye molecules are selected of different colors, the individual color can be adjusted continuously from dark to bright. Further, the wearers can adjust the first lens 230 (the second lens 330) via Bluetooth, to continuously adjust the color from dark to bright.

According to the bin-dominant effect liquid crystal technology, the liquid crystal molecules are the host and the dichroic dye molecules are the guest. The dichroic dye molecules are attached to the surfaces of the liquid crystal molecules, and are arranged in the same direction with the arrangement of the liquid crystal molecules. As such, the polarized lights parallel to the long axis of the liquid crystal molecules are absorbed, and the polarized lights perpendicular to the long axis of the liquid crystal molecules are absorbed by little amount. When the liquid crystal molecules are arranged in planar state (or in a planar helical arrangement), the dichroic dye molecules absorb lights, and the lenses show a dark state which has a light transmittance of 10%. When the liquid crystal molecules are arranged in vertical state, the dichroic dye molecules absorb only a small amount of lights, and the lenses show a transmissive state. In an embodiment, a small amount of chiral agents can be added, as such, when the liquid crystal molecules are applied with voltage to become planar state, the liquid crystal molecules can rotate and present a helical structure, which is conducive to enhancing the light-absorbing effect in the dark state.

Referring to FIG. 3, the first lens 230 and the second lens 330 each are provided with two layers of color-changing films 100. The first control element 250 is capable of applying an electric field to one layer of the color-changing films 100 in the first lens 230 individually, or is capable of applying an electric field to both of the color-changing films 100 in the first lens 230 simultaneously. The second control element 350 is capable of applying an electric field to one layer of the color-changing films 100 in the second lens 330 individually, or is capable of applying an electric field to both of the color-changing films 100 in the second lens 330 simultaneously.

Since two layers of color-changing films 100 are provided in the first lens 230, the first control element 250 is capable of applying an electric field to each of the color-changing films 100 in the first lens 230 individually, and there is a possibility of displaying two colors in the first lens 230. Since two layers of color-changing films 100 are provided in the second lens 330, the second control element 350 is capable of applying an electric field to each of the color-changing films 100 in the second lens 330 individually, and there is a possibility of displaying two colors in the second lens 330 individually. When no electric field is applied to the first lens 230 by the first control element 250, no color is displayed on the first lens 230; and when no electric field is applied to the second lens 330 by the second control element 350, no color is displayed on the second lens 330. When the first control element 250 simultaneously applies an electric field to the two layers of the color-changing films 100 in the first lens 230, the first lens 230 shows an overlaid display of two colors, and when the second control element 350 simultaneously applies an electric field to the two layers of the color-changing films 100 in the second lens 330, the second lens 330 shows an overlaid display of two colors.

Specifically, the first lens 230 is taken as an example for description, and the second lens 330 works in the same way as the first lens 230 which is not described herein. The first lens 230 has two layers of color-changing films 100, and one of the color-changing films 100 can be adjusted by the first control element 250 to show red, and the other one of the two layers of color-changing films 100 can be adjusted by the first control element 250 to show blue. The first lens 230 displays red when the first control element 250 applies individually an electric field to the color-changing film 100 who can be changed to show red, and the first lens 230 displays blue when the first control element 250 applies individually an electric field to the color-changing film 100 who can be changed to show blue. When the first control element 250 simultaneously applies an electric field to two layers of color-changing films 100 in the first lens 230, the first lens 230 displays fuchsia which defines by superimposing red and blue.

In an embodiment, the first lens 230 and the second lens 330 are both provided with three layers of color-changing films 100, and the first control element 250 is capable of applying an electric field to one layer of the color-changing films 100 in the first lens 230 individually, or is capable of applying an electric field to two layers of the color-changing films 100 simultaneously, or is capable of applying an electric field to all three layers of color-changing films 100 simultaneously. The second control element 350 is capable of applying an electric field to one layer of the color-changing films 100 in the second lens 330 individually, or is capable of applying an electric field to two layers of the color-changing films 100 simultaneously, or is capable of applying an electric field to all three layers of color-changing films 100 simultaneously. In a case that three layers of color-changing films 100 are provided in the first lens 230 (the second lens 330 works in the same way as the first lens 230 and is not be described too much here), the first control element 250 can apply or remove the electric field to each layer of the color-changing films 100 to meet the needs of the color rendering of the first lens 230.

In the embodiment in which at least two color-changing films 100 are provided in the first lens 230 and the second lens 330 respectively, in a case that the color-changing films are not energized, the light transmittance of the color-changing films 100 in the first lens 230 and the second lens 330 respectively ranges from 50% to 90%, and the light transmittance of the first lens 230 and the second lens 330 respectively ranges from 40% to 70%.

In an embodiment, the color-changing film 100 is divided into a plurality of color regions, the plurality of color regions, each of the color regions has the dichroic dyes of same or different colors, and the first control element 250 is capable of individually applying the electric field to each color region, and the second control element 350 is capable of individually applying the electric field to each color region.

Specifically, in a case that the colors of the dichroic dyes in each color region are different, electrodes individually connecting each color region are formed by etching the conductive layer so that the first control element 250 (the second control element 350) can individually supply power to the liquid crystal layer 130 in each color region. Thus, the brightness and darkness of each color region can be adjusted by controlling the voltage applied by the first control element 250 (the second control element 350), and different regions of the lens can display different colors.

As shown in FIG. 3, the color-changing film 100 further includes a first alignment layer 140 and a second alignment layer 150, the first alignment layer 140 is disposed between the first substrate layer 110 and the liquid crystal layer 130, and the second alignment layer 150 is disposed between the second substrate layer 120 and the liquid crystal layer 130.

In an embodiment, the first alignment layer 140 and the second alignment layer 150 are oriented in parallel, and are opposite to each other relative to the liquid crystal molecules in the liquid crystal layer 130. The first alignment layer 140 and the second alignment layer 150 are used to align the liquid crystal molecules in the liquid crystal layer 130, so that the liquid crystal molecules can be arranged in an orderly manner when the liquid crystal layer 130 is not subjected to the electric field. In some embodiments, the material of each of the first alignment layer 140 and the second alignment layer 150 is PI.

In an embodiment, referring to FIG. 3, the first alignment layer 140 is disposed parallel to the second oriented layer 150. However, the alignment direction of the first alignment layer 140 and the second oriented layer 150 in a same color-changing film 100 (for example, the upper color-changing film 100 shown in FIG. 3) is perpendicular to the alignment direction of the first alignment layer 140 and the second oriented layer 150 in an adjacent color-changing film 100 (for example, the lower color-changing film 100 shown in FIG. 3). As such, an included angle can be defined between the liquid crystal molecules and dye molecules in the same color-changing film 100 and the liquid crystal molecules and dye molecules in the adjacent color-changing film 100, this is, but the liquid crystal molecules and dye molecules in one color-changing film 100 are tilted spatially different from the liquid crystal molecules and dye molecules in the adjacent color-changing film 100. The light transmittance of the two layers of liquid crystal layers 130 can be effectively and widely ranges from of 5% to 70%.

Further, in an embodiment, the first substrate layer 110 and/or the second substrate layer 120 are provided with a polarizer/reflector on the side away from the liquid crystal layer 130 to further change the range of light transmittance of the first lens 230 (second lens 330).

Figure 4:
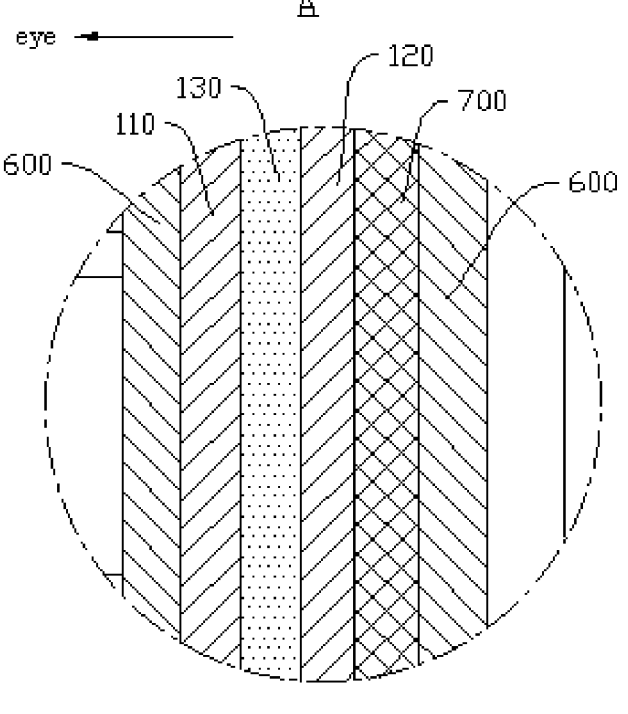
FIG. 4 is an enlarged view of A of FIG. 2 according to an embodiment of the present application.
Figure 5:
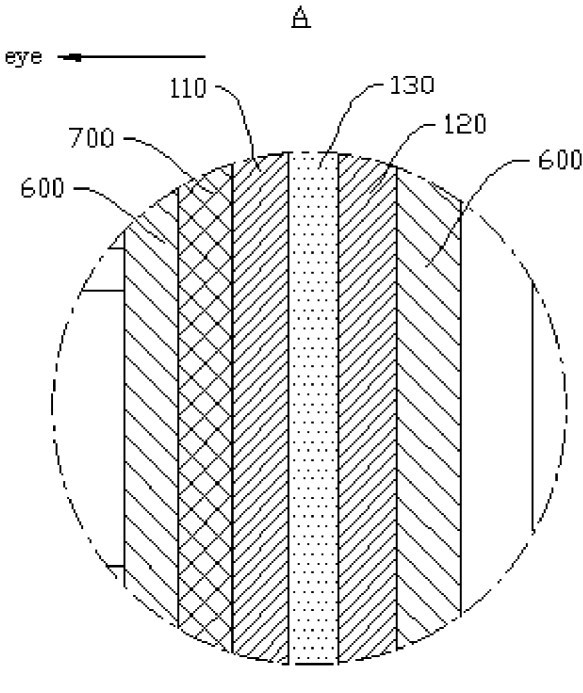
FIG. 5 is an enlarged view of A of FIG. 2 according to another embodiment of the present application.

Referring to FIG. 4 and FIG. 5, the first lens 230 and the second lens 330 each include two layers of anti-fingerprint layers 600. The anti-fingerprint layers 600 are respectively attached to the opposite sides of the first lens 230 (the second lens 330), for example, attached to the first substrate 110 and the second substrate 120 respectively. As such, the fingerprints fail to leave on the lenses due to touching, moreover, the dust can be effectively prevented from leaving on the lenses either.

In an embodiment, referring to FIG. 4 and FIG. 5 (the arrow indicates that the lights reach the eye), the first lens 230 and the second lens 330 each include an anti-blue light layers 700 for eye protection. As shown in FIG. 4, the anti-blue light layer 700 may be provided on a side of the color-changing film 100 in the first lens 230 (second lens 330) away from the eye, and as shown in FIG. 5, the anti-blue light layer 700 may be provided on a side of the color-changing film 100 in the first lens 230 (second lens 330) close to the eye.

Since the anti-blue light layer 700 is disposed on the side of the color-changing film 100 close to the eye, the color-changing film 100 can effectively conceal the color of the anti-blue light layer 700, which effectively improves the color purity of the color-changing eyeglass during color development. It should be appreciated that the anti-blue light layer 700 can reflect part of the colored lights.

Since the anti-blue light layer 700 is disposed on the side of the color-changing film 100 away from the eyes, the color of the color-changing eyeglass appears lighter due to the reflection of the anti-blue light layer 700.

Figure 6:
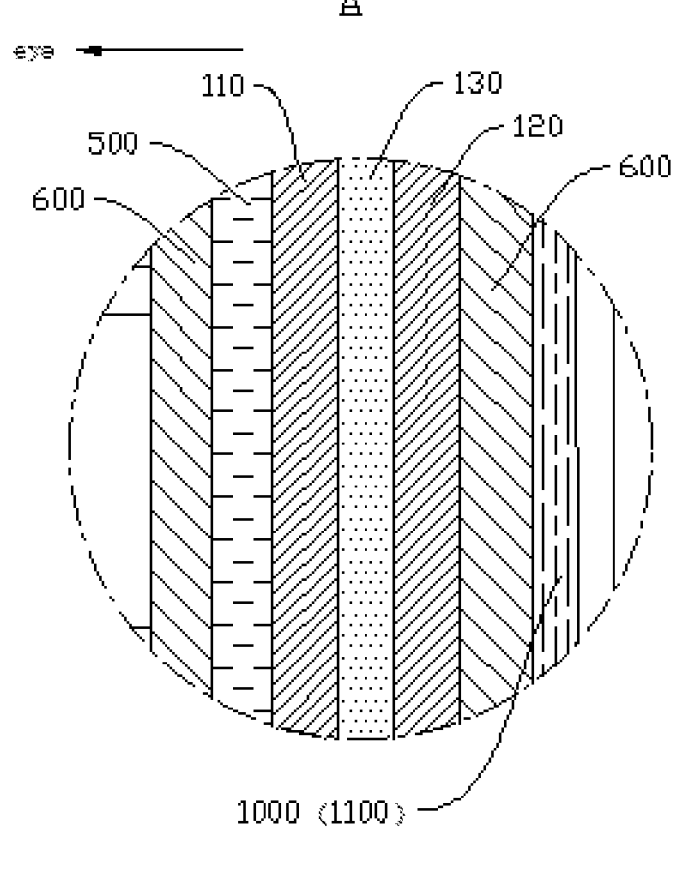
FIG. 6 is an enlarged view of A of FIG. 2 according to yet another embodiment of the present application.

Referring to FIG. 6, the first lens 230 and the second lens 330 each include a color blindness correction film 500. The color blindness correction film 500 can adjust the ratio of the three basic colors of the incident lights to the normal spectral curve, as such, the color-changing eyeglass of the embodiment of the present application can be suitable for the color blinded. The color blinded can have visions with same colors as the normal when they wear the color-changing eyeglass of the embodiment of the present application. The color blindness correction film 500 can be provided between the anti-fingerprint layers 600 and the color-changing film 100. The color blindness correction film 500 can be disposed on the side of the color-changing film 100 close to the eye, or on the side of the color-changing film 100 away from the eye.

In an embodiment, referring to FIG. 6, the first lens 230 includes a first progressive layer 1000, the first progressive layer 1000 is attached to the color-changing film 100 on the first lens 230, and the second lens 330 includes a second progressive layer 1100, the second proximity layer 1100 is attached to the color-changing film 100 on the second lens 330. In this way, the color-changing eyeglass of the present embodiment can be applied to people with different degrees of hyperopia, and enabling the wearers to see things in front of the eyes more clearly with wearing the color-changing eyeglass.

Back to FIG. 1 and FIG. 2, in an embodiment, the first glasses frame 220 can be connected with the second glasses frame 320 directly, or the first glasses frame 220 can be connected with the second glasses frame 320 through the connecting member 400. Further, other means in addition to the connecting member 400 to connect the first glasses frame 220 and the second glasses frame 320 can be applied herein. Moreover, in an embodiment of the present application, the connecting member 400 can be individually disassembled and be replaced with a new one in a case that the connecting member 400 is damaged, which is simple and convenient to operate. In addition, the shape of the connecting member 400 is not limited, and different shapes of the connecting member 400 can be designed for the wearers. The wearers may choose the shape of the connecting member 400 based on their own needs, so as to make the color-changing eyeglass more trendy and more in line with their own styles.

In an embodiment, referring to FIG. 2, the color-changing eyewear further includes a first audio 800 and a second audio 900, the first audio 800 is disposed in the first recess 260 to connect to the first eyewear arm 210, and the second audio 900 is disposed in the second recess 360 to connect to the second eyewear arm 310. The first audio 800 and the second audio 900 can communicate and connect with a communication device via Bluetooth.

In this embodiment, the wearer can use Bluetooth to connect the communication device (e.g., a cellular phone) with the color-changing eyeglass. The sounds from the communication device can be played by the first audio 800 and the second audio 900 of the color-changing eyeglass. As such, the color-changing eyeglass of the present application can function as a Bluetooth headset.

Specifically, the first eyeglass arm 210 is provided with a first sound port 810 at a position close to the left ear, similarly the second eyeglass arm 310 is provided with a second sound port 910 at a position close to the right ear. The first audio 800 is disposed correspondingly to the first sound port 810, and the second audio 900 is disposed correspondingly to the second sound port 910. As such, the sounds from the first audio 800 and the second audio 900 can be easily conducted to the wearer's ears.

The embodiments of the present application provide a first control element on the first eyeglass arm and a second control element on the second eyeglass arm. The first control element individually regulates the color of one or more layers of the color-changing films in the first lens, at the same time, the second control element individually regulates the color of one or more layers of the color-changing films in the second lens.

The color-changing films of the color-changing eyeglass can be changed to show transparent under the control of the control elements, and can be switched between a transparent state and an opaque state, thereby providing the wearer with a wide range of vision and a good visual experience.

It should be noted that the technical solutions between the various embodiments of the present application can be combined with each other, but it should be based on what can be realized by a person of ordinary skill in the field, and when the combination of technical solutions appears to be contradictory or unattainable it should be assumed that the combination of such technical solutions does not exist, and is not within the scope of the protection claimed by the present application.

The above mentioned is only a part or preferred embodiment of the present application, neither the description nor the accompanying drawings can thus limit the scope of protection of the present application, all the equivalent structural modification made by the cores or contents of the specification and the accompanying drawings of the present application, or directly or indirectly applying the present application in other related technical fields are included in the scope of protection of the present application.

What is claimed is:

1. A color-changing eyeglass, comprising:
a plurality of layers of color-changing films, one layer of the color-changing films displays a same or different color as another layer of the color-changing films in a case that an electric field is applied to the color-changing films;
a first eyeglass arm, wherein the first eyeglass arm is provided with a first control element;
a first glasses frame, wherein the first eyeglass arm is pivoted with the first glasses frame;
a first lens, wherein the first lens is attached to the first glasses frame, one or more layers of the color-changing films are stacked in the first lens, and the first control element is electrically connected to the first lens and is configured to apply the electric field to the one or more layers of the color-changing films in the first lens;
a second eyeglass arm, wherein the second eyeglass arm is provided with a second control element;

a second glasses frame, wherein the second eyeglass arm is pivoted with the second glasses frame; and a second lens, wherein the second lens is attached to the second glasses frame, one or more layers of the color-changing films are stacked in the second lens, and the second control element is electrically connected to the second lens and is configured to apply the electric field to the one or more layers of the color-changing films in the second lens;

wherein the first glasses frame is connected with the second glasses frame;

wherein the first control element is communicated with the second control element, a color of the color-changing film in the first lens is changeable based on a voltage provided by the first control element, and a color of the color-changing film in the second lens is changeable based on a voltage provided by the second control element in response to a signal from the first control element;

wherein each of the plurality of color-changing films comprises a first substrate layer, a first alignment layer, a liquid crystal layer, a second alignment layer, and a second substrate layer stacked sequentially, wherein the first alignment layer and the second alignment layer are oriented in parallel, and are oriented opposite to each other relative to liquid crystal molecules in the liquid crystal layer;

wherein alignment direction of the first alignment layer and the second alignment layer in one color-changing film is different from alignment direction of the first alignment layer and the second alignment layer in an adjacent color-changing film, and liquid crystal molecules and dye molecules in the one color-changing film are tilted spatially different from liquid crystal molecules and dye molecules in the adjacent color-changing film.

2. The color-changing eyeglass of claim 1, wherein the first control element applies the electric field to each layer of the color-changing films in the first lens individually, or applies the electric field to at least two layers of the color-changing films in the first lens simultaneously.

3. The color-changing eyeglass of claim 1, wherein the first lens and the second lens each comprise a color blindness correction film, the color blindness correction film of the first lens is attached to the color-changing film in the first lens, the color blindness correction film of the second lens is attached to the color-changing film in the second lens, and the color blindness correction film is configured to adjust a ratio of three basic colors of incident lights to a normal spectral curve.

4. The color-changing eyeglass of claim 3, wherein the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

5. The color-changing eyeglass of claim 4, wherein the color blindness correction film of the first lens is disposed between one layer of the anti-fingerprint layers and the color-changing film in the first lens, and the color blindness correction film of the second lens is disposed between one layer of the anti-fingerprint layers and the color-changing film in the second lens.

6. The color-changing eyeglass of claim 1, wherein the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

7. The color-changing eyeglass of claim 6, wherein the first lens and the second lens each comprise an anti-blue light layer, the anti-blue light layer of the first lens is attached between one layer of the anti-fingerprint layers and the color-changing film in the first lens, and the anti-blue light layer of the second lens is attached between one layer of the anti-fingerprint layers and the color-changing film in the second lens.

8. The color-changing eyeglass of claim 7, wherein the anti-blue light layer of the first lens is disposed on a side of the color-changing film in the first lens close to an eye, and the anti-blue light layer of the second lens is disposed on a side of the color-changing film in the second lens close to the eye.

9. The color-changing eyeglass of claim 7, wherein the anti-blue light layer of the first lens is disposed on a side of the color-changing film in the first lens away from an eye, and the anti-blue light layer of the second lens is disposed on a side of the color-changing film in the second lens away from the eye.

10. The color-changing eyeglass of claim 1, wherein the first lens and the second lens each comprise an anti-blue light layer, the anti-blue light layer of the first lens is attached to the color-changing film in the first lens, and the anti-blue light layer of the second lens is attached to the color-changing film in the second lens.

11. The color-changing eyeglass of claim 1, wherein the first lens comprises a first progressive layer, and the first progressive layer is attached to the color-changing film in the first lens, and wherein the second lens comprises a second progressive layer, the second progressive layer is attached to the color-changing film in the second lens.

12. The color-changing eyeglass of claim 1, wherein each of the color-changing films is divided into a plurality of color regions, each of the color regions has dichroic dyes of same or different colors, the first control element applies the electric field individually to each of the color regions, and the second control element applies the electric field individually to each of the color regions.

13. The color-changing eyeglass of claim 1, wherein the color-changing eyeglass further comprise a first audio and a second audio, the first audio is connected to the first eyeglass arm, the second audio is connected to the second eyeglass arm, and the first audio and the second audio each are configured to communicate with a communication device via Bluetooth and to play sounds.

14. The color-changing eyeglass of claim 13, wherein the first glasses frame comprises a first recess inside, and the second glasses frame comprises a second recess inside, wherein the first control element and the first audio are disposed in the first recess, and the second control element and the second audio are disposed in the second recess.

15. The color-changing eyeglass of claim 14, wherein the color-changing eyeglass comprises a first battery and a second battery, the first battery is disposed in the first recess and is configured to supply power to the first control element, and the second battery is disposed in the second recess and is configured to supply power to the second control element.

16. The color-changing eyeglass of claim 1, wherein the first glasses frame is integrated with the second glasses frame.

17. The color-changing eyeglass of claim 1, wherein the first glasses frame is connected with the second glasses frame through a connecting member.

18. A color-changing eyeglass, comprising:

a plurality of layers of color-changing films, one layer of the color-changing films displays a same or different color as another layer of the color-changing films in a case that an electric field is applied to the color-changing films;

a first eyeglass arm, wherein the first eyeglass arm is provided with a first control element;

a first glasses frame, wherein the first eyeglass arm is pivoted with the first glasses frame;

a first lens, wherein the first lens is attached to the first glasses frame, one or more layers of the color-changing films are stacked in the first lens, and the first control element is electrically connected to the first lens and is configured to apply the electric field to the one or more layers of the color-changing films in the first lens;

a second eyeglass arm, wherein the second eyeglass arm is provided with a second control element;

a second glasses frame, wherein the second eyeglass arm is pivoted with the second glasses frame; and a second lens, wherein the second lens is attached to the second glasses frame, one or more layers of the color-changing films are stacked in the second lens, and the second control element is electrically connected to the second lens and is configured to apply the electric field to the one or more layers of the color-changing films in the second lens;

wherein the first glasses frame is connected with the second glasses frame;

wherein the first control element is communicated with the second control element, a color of the color-changing film in the first lens is changeable based on a voltage provided by the first control element, and a color of the color-changing film in the second lens is changeable based on a voltage provided by the second control element in response to a signal from the first control element;

wherein the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

19. A color-changing eyeglass, comprising:

a plurality of layers of color-changing films, one layer of the color-changing films displays a same or different color as another layer of the color-changing films in a case that an electric field is applied to the color-changing films;

a first eyeglass arm, wherein the first eyeglass arm is provided with a first control element;

a first glasses frame, wherein the first eyeglass arm is pivoted with the first glasses frame;

a first lens, wherein the first lens is attached to the first glasses frame, one or more layers of the color-changing films are stacked in the first lens, and the first control element is electrically connected to the first lens and is configured to apply the electric field to the one or more layers of the color-changing films in the first lens;

a second eyeglass arm, wherein the second eyeglass arm is provided with a second control element;

a second glasses frame, wherein the second eyeglass arm is pivoted with the second glasses frame; and a second lens, wherein the second lens is attached to the second glasses frame, one or more layers of the color-changing films are stacked in the second lens, and the second control element is electrically connected to the second lens and is configured to apply the electric field to the one or more layers of the color-changing films in the second lens;

wherein the first glasses frame is connected with the second glasses frame;

wherein the first control element is communicated with the second control element, a color of the color-changing film in the first lens is changeable based on a voltage provided by the first control element, and a color of the color-changing film in the second lens is changeable based on a voltage provided by the second control element in response to a signal from the first control element;

wherein the first lens and the second lens each comprise a color blindness correction film, the color blindness correction film of the first lens is attached to the color-changing film in the first lens, the color blindness correction film of the second lens is attached to the color-changing film in the second lens, and the color blindness correction film is configured to adjust a ratio of three basic colors of incident lights to a normal spectral curve.

20. The color-changing eyeglass of claim 19, wherein the first lens and the second lens each comprise two layers of anti-fingerprint layers, the two layers of anti-fingerprint layers of the first lens are attached to opposite sides of the first lens, and the two layers of anti-fingerprint layers of the second lens are attached to opposite sides of the second lens.

\* \* \* \* \*